(12) United States Patent
Chou

(10) Patent No.: US 9,550,333 B2
(45) Date of Patent: Jan. 24, 2017

(54) SEALANT DISPENSER

(71) Applicant: Wen-San Chou, Tainan (TW)

(72) Inventor: Wen-San Chou, Tainan (TW)

( * ) Notice: Subject to any disclaimer, the term of this patent is extended or adjusted under 35 U.S.C. 154(b) by 0 days.

(21) Appl. No.: 14/929,334

(22) Filed: Oct. 31, 2015

(65) Prior Publication Data

US 2016/0121563 A1    May 5, 2016

(30) Foreign Application Priority Data

Nov. 5, 2014  (TW) .............................. 103138447 A

(51) Int. Cl.
*B29C 73/02* (2006.01)
*B29C 73/16* (2006.01)
*B05B 7/24* (2006.01)
*B29L 30/00* (2006.01)

(52) U.S. Cl.
CPC ........... *B29C 73/025* (2013.01); *B05B 7/2491* (2013.01); *B29C 73/166* (2013.01); *B29L 2030/00* (2013.01)

(58) Field of Classification Search
CPC ...... B60C 25/16; B29C 73/166; B29C 73/025; B60S 5/04
USPC ........................................................ 152/415
See application file for complete search history.

(56) References Cited

U.S. PATENT DOCUMENTS

| | | | | |
|---|---|---|---|---|
| 2014/0261878 A1* | 9/2014 | Jhou | ..................... | B29C 73/163 141/38 |
| 2015/0059921 A1* | 3/2015 | Jhou | ....................... | F04B 35/06 141/38 |
| 2015/0158257 A1* | 6/2015 | Wang | .................... | B29C 73/166 141/38 |
| 2016/0016559 A1* | 1/2016 | Wang | .................... | B29C 73/166 141/38 |
| 2016/0136906 A1* | 5/2016 | Chou | .................... | B29C 73/025 141/38 |
| 2016/0159017 A1* | 6/2016 | Chou | .................... | B29C 73/025 141/38 |

FOREIGN PATENT DOCUMENTS

| | | | | | |
|---|---|---|---|---|---|
| DE | | 102007053241 A1 | * | 5/2009 | ........... B29C 73/166 |
| DE | WO | 2009065653 A1 | * | 5/2009 | ........... B29C 73/166 |

OTHER PUBLICATIONS

English Translation of DE102007053241A1, Google Translations, Jun. 23, 2016.*

* cited by examiner

*Primary Examiner* — Timothy L Maust
*Assistant Examiner* — Timothy P Kelly

(57) ABSTRACT

A sealant dispenser, which can cooperate with an air compressor for repairing punctured tires, is disclosed. The sealant dispenser generally includes a bottle with a top opening being filled with a chemical sealant, a cap mounted over the top opening of the bottle, a control valve for controlling an air passage and a sealant passage defined at the cap, and a rotary handle. In use, the air passage receives compressed air from the air compressor, and the sealant passage is connected to a tire to be repaired. By turning the rotary handle, the air passage and the sealant passage can communicate with the inner space of the bottle, which allows the compressed air to flow into the inner space of the bottle to force the chemical sealant contained therein to flow into the interior of the punctured tire, thus repairing the tire.

5 Claims, 8 Drawing Sheets

SEALANT DISPENSER

TECHNICAL FIELD OF THE INVENTION

The present invention relates to a sealant dispenser and, more particularly, to a sealant dispenser for cooperating with an air compressor, which includes a bottle containing a chemical sealant, a cap, a control valve, and a rotary handle. By turning the rotary handle, compressed air supplied from the air compressor can flow into the bottle to force the chemical sealant contained therein to flow into a punctured tire, so that the tire can be inflated and repaired effectively and reliably.

DESCRIPTION OF THE PRIOR ART

Most of conventional sealing dispensers include a bottle, a cap, and a tube. The bottle is filled with a chemical sealant, which can be used to repair punctured tires. The cap is provided with an inlet for receiving compressed air from an air compressor and an outlet for delivering the chemical sealant to an object such as a tire. The tube is mounted with the cap and inserted into the bottle. In operation, the compressed air can flow into the bottle via the inlet to force the chemical sealant to pass through the tube and finally flow into a punctured tire via the outlet and a hose connected between the outlet and the air nozzle of the tire, so that the punctured tire can be repaired.

The applicant has contrived a sealant dispenser with an improved structure, which can be operated more effectively and reliably than conventional ones.

SUMMARY OF THE INVENTION

One object of the present invention is to provide a sealant dispenser, wherein a bottle is filled with a chemical sealant, a cap is mounted over a top opening of the bottle, the cap defines an air passage for receiving compressed air from an air compressor and defines a sealant passage for delivering the chemical sealant to a punctured tire, a control valve mounted in the bottle for controlling the air passage and the sealant passage, and a rotating means provided on the bottle for actuating the control valve to open the air passage and the sealant passage so that the compressed air can flow into the bottle to force the chemical sealant to flow into the punctured tire via the sealant passage, so that the tire can be repaired.

According to one feature of the present invention, when the rotating means is rotated, an elongated rod can force the control valve to move downwardly, so that an upper plug and an inner stepped plug of the control valve can be respectively removed from a short tube and a lower pipe of the cap, so that the compressed air can force the chemical sealant to flow out of the sealant passage.

Specifically, the rotating means is a rotary handle mounted over the cap. The cap is provided with a short post having a non-circular cross section, two adjacent sides of which are formed into a right-angled part. The rotary handle defines a track along a cylindrical shell thereof, wherein the track extends from an entrance opening, which is defined at a bottom of the cylindrical shell of the rotary handle, to a terminal end at a higher position. Furthermore, the cylindrical shell of the handle is provided, close to the terminal end of the track, with an engagement pin, which can engage with the short post of the cap so as to fix the rotary handle in the rotated position.

Specifically, in one embodiment, the sealant dispenser includes a bottle, a cap, an elongated rod, a control valve, and a rotary handle. The cap, which is mounted to the bottle, includes integrally formed upper and lower pipes, which respectively defines inner passages communicating with each other. The upper pipe is provided with an air input connection tube defining an air passage for receiving compressed air from an air compressor and provided with a sealant output connection tube defining a sealant passage communicating with the inner passage of the upper pipe. The elongated rod is fitted in the inner passages of the upper and lower pipes. The control valve, which receives a lower section of the lower pipe, can open or close an intermediate channel, which communicates with the air passage of the air input connection tube, and the inner passage of the lower pipe. The rotary handle is mounted over the upper pipe of the cap to touch a top end of the elongated rod. As such, rotation of the rotary handle allows the elongated rod to move the control valve downwardly to open the intermediate channel and the inner passage of the lower pipe, so that the compressed air can flow into the bottle by way of the air passage, and the chemical sealant in the bottle can be forced by the compressed air to flow out of the bottle via the inner passages of the upper and lower pipes, and the sealant passage, and finally enter a punctured tire by a hose connected between the sealant output connection tube and the air nozzle of the tire, so that the punctured tire can be inflated and repaired effectively and reliably, and thus the time required for inflating and repairing the tire can be significantly reduced.

Other objects, advantages, and novel features of the present invention will become more apparent from the following detailed description when taken in conjunction with the accompanying drawings.

DETAILED DESCRIPTION OF THE PREFERRED EMBODIMENTS

Figure 1:
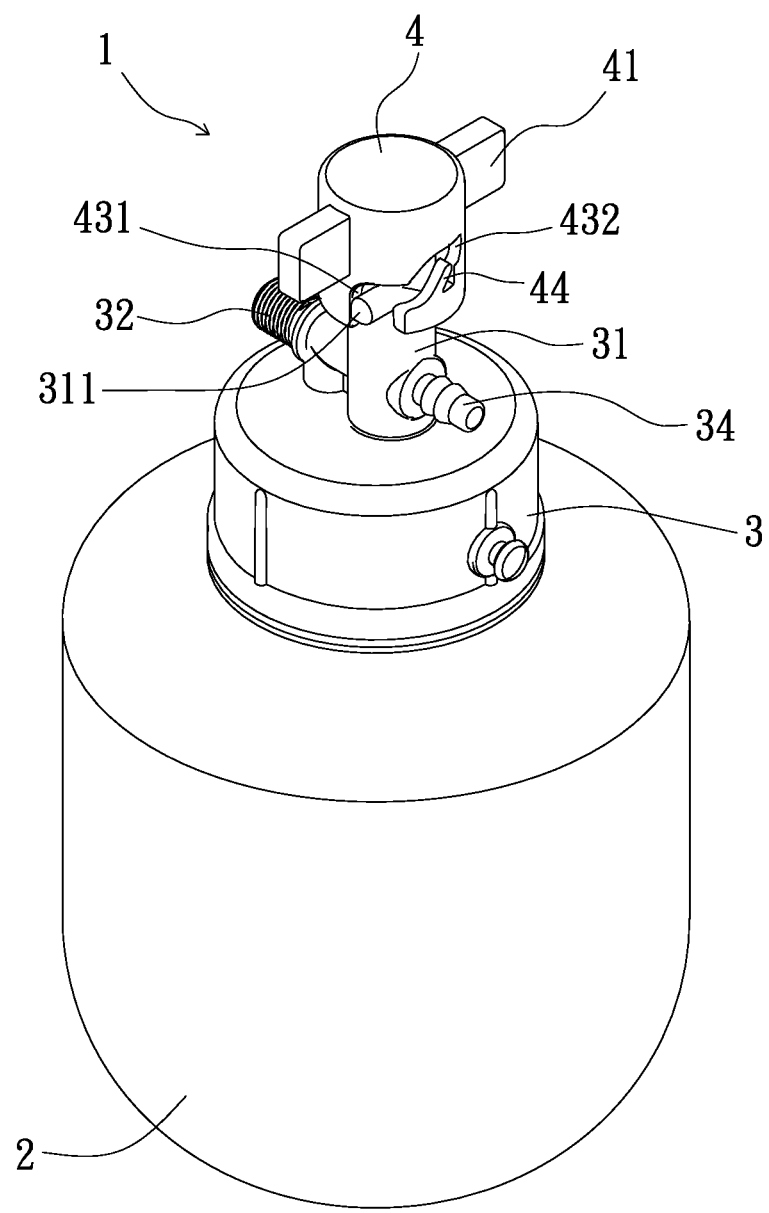
FIG. 1 shows a 3-dimensional view of a sealant dispenser according to one embodiment of the present invention.
Figure 2:
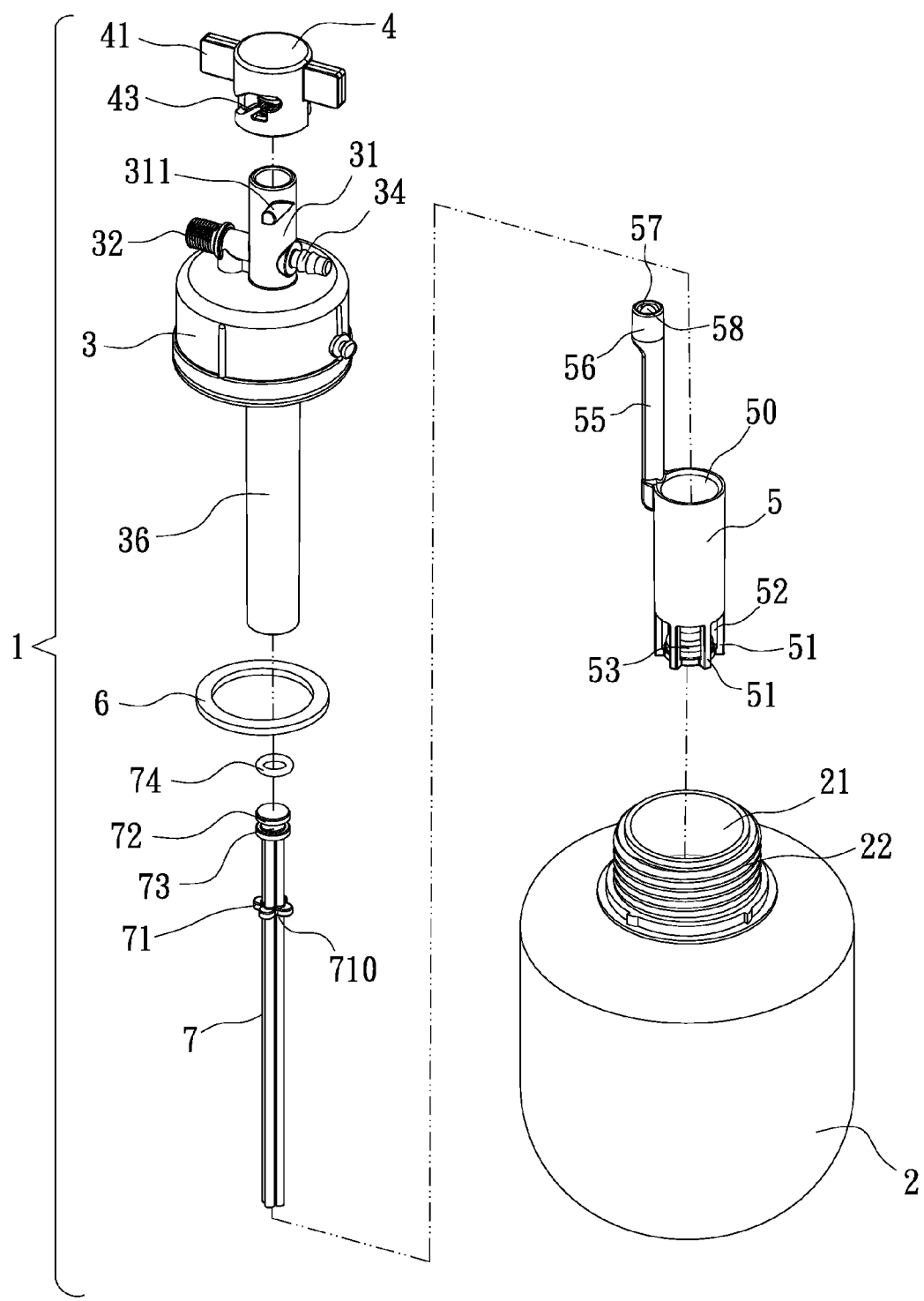
FIG. 2 shows an exploded view of the sealant dispenser.
Figure 3:
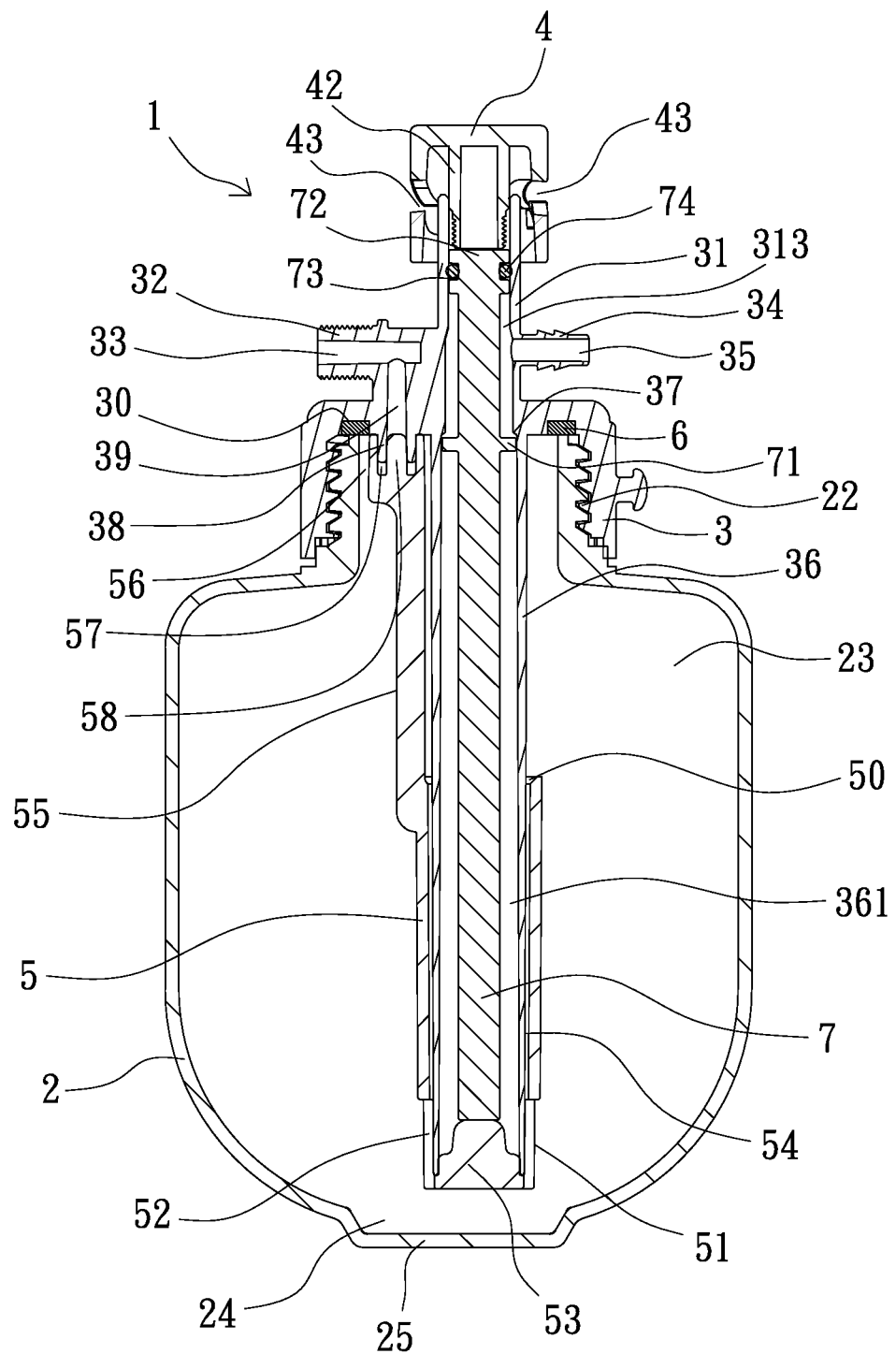
FIG. 3 shows a sectional view of the sealant dispenser.
Figure 4:
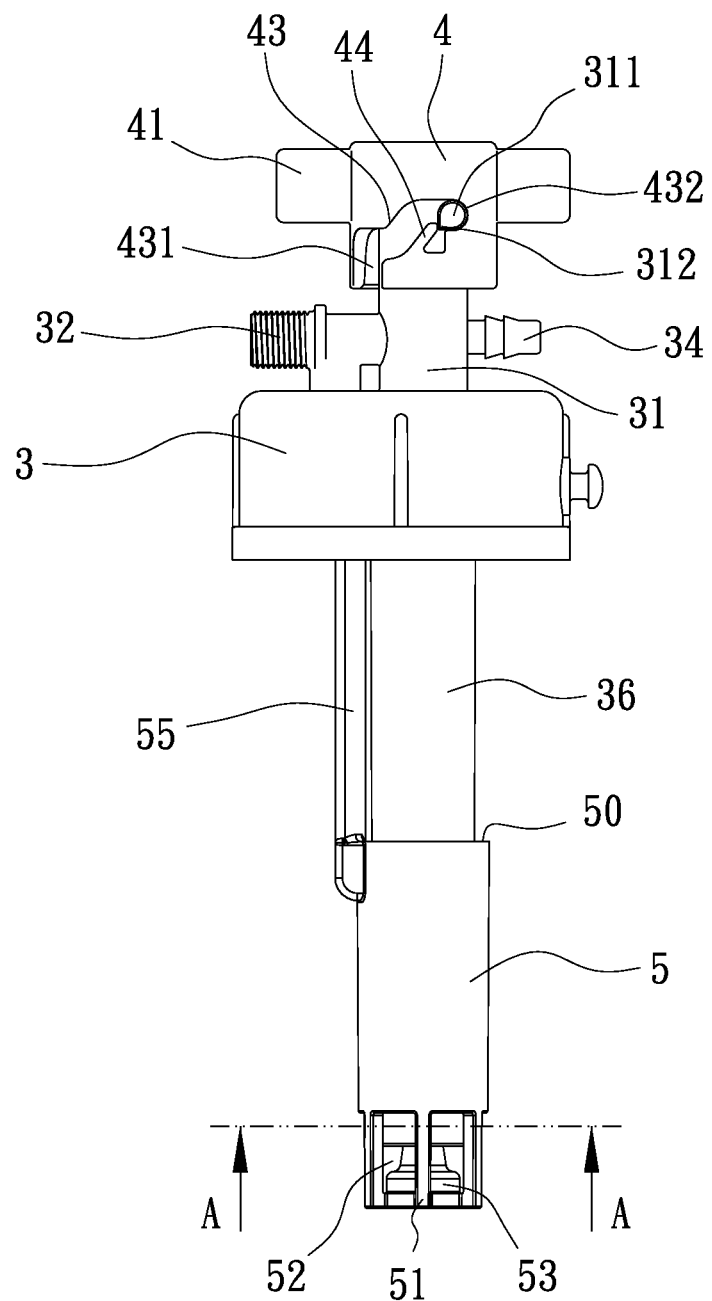
FIG. 4 shows a plan view of an assembled structure consisting of a cap, a control valve, and a rotary handle used in the sealant dispenser.

The present invention provides a sealant dispenser 1, which can cooperate with an air compressor for repairing punctured tires, wherein a bottle 2 is used to store a chemical sealant 26, a cap 3 is mounted over a top opening 21 of the bottle 2, a control valve 5 is used to open or close an air passage 33 and a sealant passage 35. In operation, a user may turn a rotating means provided over the cap 3 to open the air passage 33 and the sealant passage 35, to allow compressed air supplied from the air compressor to flow into the bottle 2 by way of the air passage 33, and the chemical sealant 26 can be forced to flow out of the bottle via the sealant passage 35. A detailed illustration of one embodiment of the present invention is provided in the following paragraphs.

Referring first to FIGS. 1 through 4, the sealant dispenser 1 generally comprises a bottle 2 and a cap 3. The bottle 2 defines therein an inner space 23. The bottle 2 has a neck portion, which defines a top opening 21, and a flat bottom 25 opposite to the top opening 21. The neck portion of the bottle 1 is provided with external threads 22. A recessed space 24 is defined above the flat bottom 25. A chemical sealant 26, which can repair punctured tires, is stored in the inner space 23 of the bottle 2.

The cap 3 is threadedly mounted to the neck portion of the bottle 2 which defines the top opening 21. The cap 3 defines at its inner surface an annular groove 30 to be fitted with a gasket 6, which allows the cap 3 to seal the top opening 21 of the bottle 2 more properly. An upper pipe 31, which is integrally formed with the cap 3, extends upwardly from the top of the cap 3. A lower pipe 36, which is integrally formed with the cap 3, extends downwardly from the inner surface of the cap 3. The upper pipe 31 defines an inner passage 313 while the lower pipe 36 defines an inner passage 361. The inner passage 313 of the upper pipe 31 communicates with the inner passage 361 of the lower pipe 36. A horizontal short post 311 is provided at the upper pipe 31. The short post 311 has a non-circular cross section, two sides of which are formed into a right-angled part 312 (see FIG. 4). Furthermore, the upper pipe 31 is provided with an air input connection tube 32 and a sealant output connection tube 34. The air input connection tube 32 defines the air passage 33. The inner surface of the cap 3 is provided with a short tube 38, which communicates with an intermediate channel 39 defined in the cap 3. The air passage 33 can communicate with the inner space 23 of the bottle 2 via the intermediate channel 39 that communicates with the short tube 38. The sealant output connection tube 34 defines the sealant passage 35. The sealant passage 35 communicates with the inner passage 313 of the upper tube 31. The inner passage 313 of the upper pipe 31 has a diameter less than the inner passage 361 of the lower pipe 36 such that an inner conical surface 37 is formed between the inner passage 313 of the upper pipe 31 and the inner passage 361 of the lower pipe 36.

A non-circular elongated rod 7 has an enlarged top end 72, which defines an annular groove 73 to be fitted with an O-ring 74. Furthermore, the elongated rod 7 is provided below the top end 72 with a projection 71 defining multiple concavities 710. The elongated rod 7 can be fitted in the inner passages 313, 361 through the lower end of the lower pipe 36, wherein the inner conical surface 37 can facilitate the top end 72 of the elongated rod 7 with the O-ring 74 to be inserted into the inner passage 313 of the upper pipe 31; furthermore, due to the projection 71 of the elongated rod 7 being blocked by the conical surface 37, the elongated rod 7 can be prevent from sliding out of the inner passage 313 of the upper pipe 31.

The control valve 5 has a tube and a stem 55. The tube of the control valve 5 defines therein a central bore 54 which opens out at a top opening 50 thereof. Furthermore, the tube of the control valve 5 is provided at its bottom with multiple strips 51 and defines multiple gaps 52 between the strips 51. An inner stepped plug 53 is attached to lower ends of the strips 51 and surrounded by the multiple gaps 52. The stem 55 extends upwardly from the end of the tube which defines the top opening 50. A distal end of the stem 55 is formed into an upper plug 56 which has a central pin 58 and defines an annular cavity 57 around the central pin 58. The lower pipe 36 can be inserted into the central bore 54 of the tube of the control valve 5 via the top opening 50 such that a lower end of the lower pipe 36 is snugly fitted over the inner stepped plug 53 and thus closes the inner passage 361 of the lower pipe 36, and a lower end of the elongated rod 7 is in contact with the stepped plug 53. The central pin 58 of the upper plug 56 can be inserted into the short tube 38 to block the intermediate channel 39 that communicates with the air passage 33 of the air input connection tube 32. At the same time, the annular cavity 57 can be snugly fitted around the short tube 38.

The rotating means used in the embodiment of the present invention is a cap-shaped rotary handle 4, which can be mounted over the upper pipe 31 to touch the elongated rod 7. The rotary handle 4 has a cylindrical shell with a closed top, two opposite blades 41 provided at the cylindrical shell, and a central post 42 extending downwardly from an inner surface of the closed top and capable of touching the top end 72 of the elongated rod 7. The rotary handle 4 defines a track 43 along the cylindrical shell thereof, wherein the track 43 extends from an entrance opening 431, which is defined at a bottom of the cylindrical shell of the rotary handle 4, to a terminal end 432 at a higher position. Furthermore, the cylindrical shell of the rotary handle 4 is provided, close to the terminal end 432 of the track 43, with an engagement pin 44 for engaging with the right-angled part 312 of the short post 311.

Figure 5:
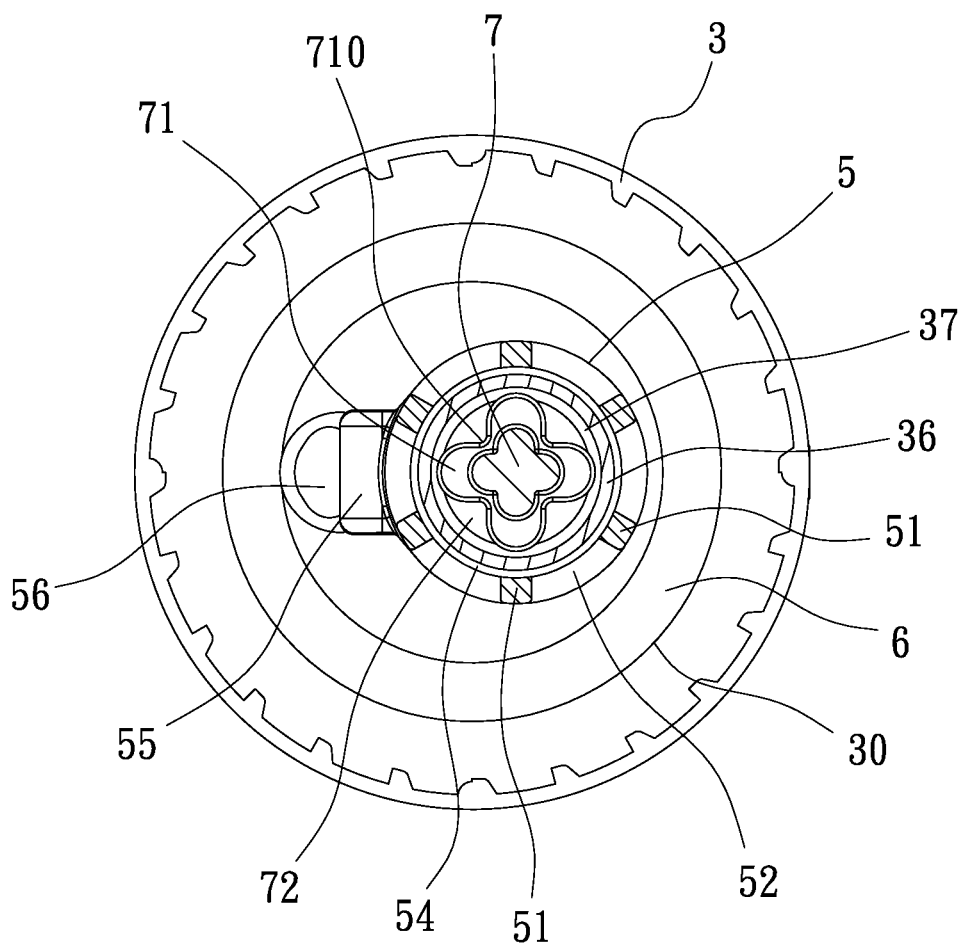
FIG. 5 shows a sectional view of the assembled structure taken along line A-A in FIG. 4.
Figure 6:
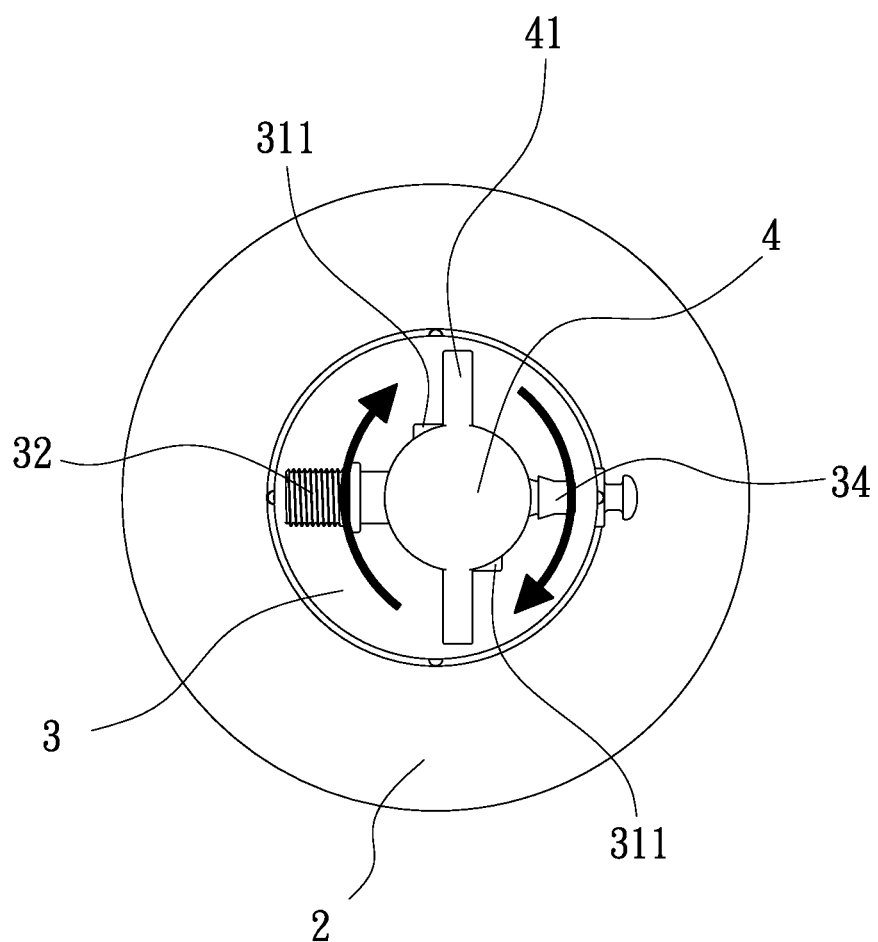
FIG. 6 shows a schematic view of the sealant dispenser, wherein the rotary handle is being rotated for operating the sealant dispenser.
Figure 7:
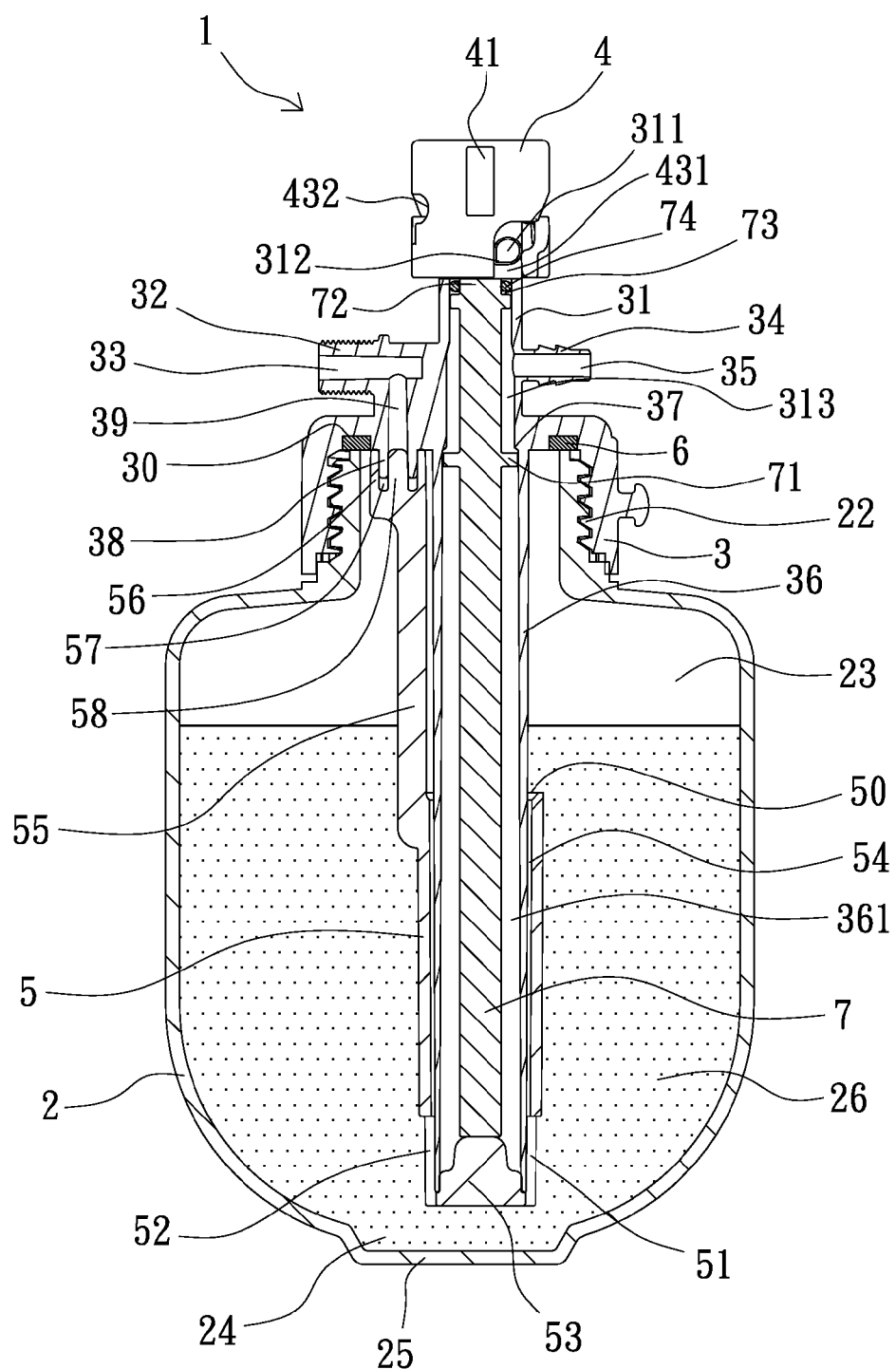
FIG. 7 shows a schematic view of the sealant dispenser, which is at its initial state.
Figure 8:
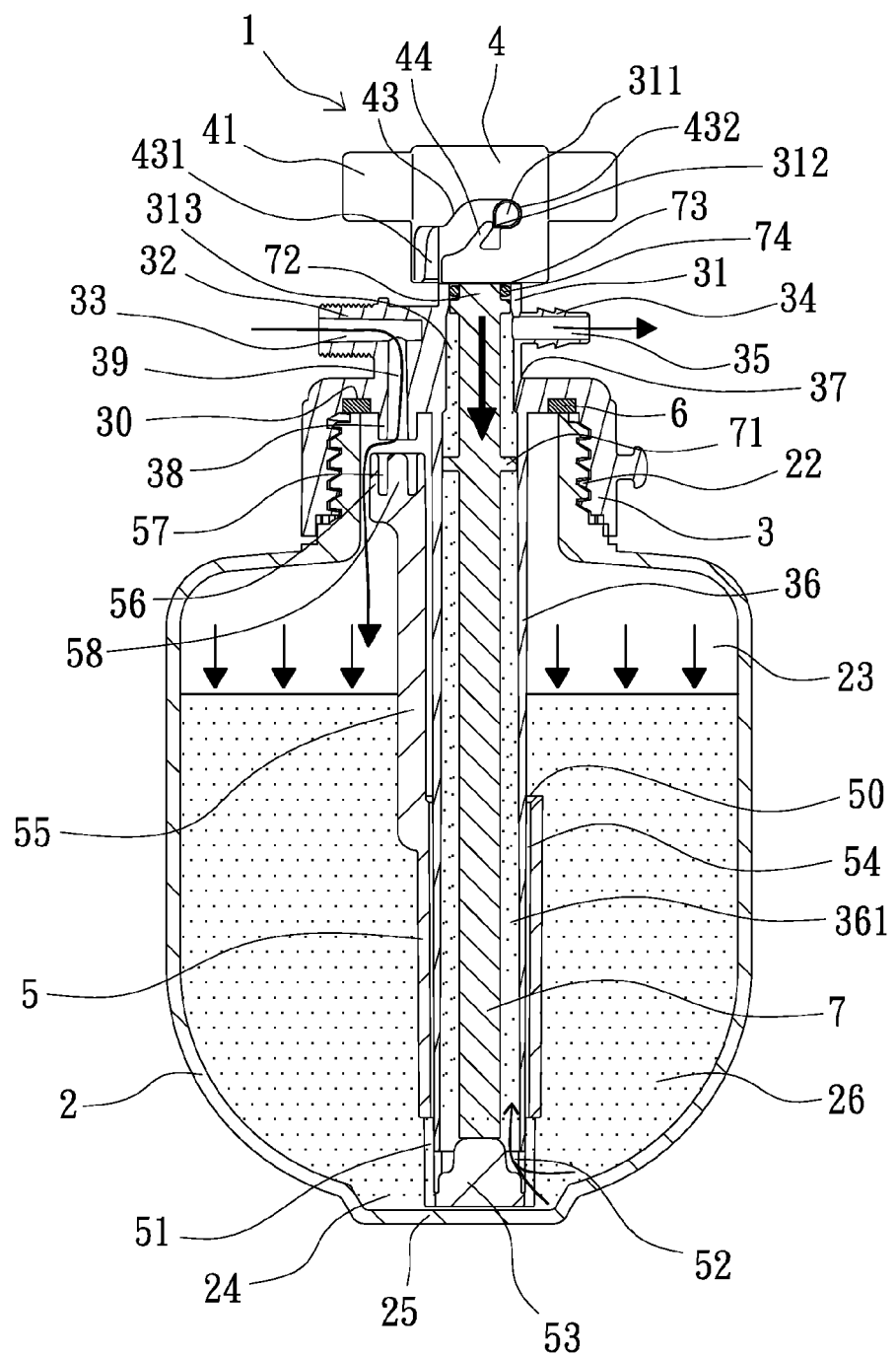
FIG. 8 shows a schematic view of the sealant dispenser, which demonstrates the air flow and the sealant flow after the rotary handle has been rotated.

FIG. 7 shows a initial state of the sealant dispenser 1, wherein the intermediate channel 39 is blocked by the upper plug 56 of the control valve 5, the lower pipe 36 is blocked by the inner stepped plug 53 of the control valve 5, and the elongated rod 7 is in contact with the inner stepped plug 53. As shown, the intermediate channel 39 does not communicate with the inner space 23 of the bottle 2, and the inner passages 313, 361 of the upper and lower pipes 31, 36 do not communicate with the inner space 23 of the bottle 2. In operation, the short post 311 can be aligned with the entrance opening 431 of the track 43 to have the rotary handle 4 mounted over the upper pipe 31 of cap 3. Next, the rotary handle 4 can be rotated (see FIG. 6), to allow the short post 311 to move relative to the rotary handle 4, along the track 43, to reach the terminal end 432, at which the engagement pip 44 can engage with the right-angled part 312 of the short post 311 provided at the upper pipe 31, so that the short post 311 can be retained at the terminal end 432 of the track 43 (see FIG. 8) and thus the rotary handle 4 can be fixed at the rotated position. Since the short post 311 is stationary, during the relative movement, the rotary handle 4 is moved downwardly. Furthermore, due to the central post 42 of the rotary handle 4 being located to touch the top end 72 of the elongated rod 7, the downward movement of the rotary handle 4 will cause the elongated rod 7 to move downwardly. Thus, the inner stepped plug 53, which is in contact with the lower end of the elongated rod 7, can be forced by the central post 42 of the rotary handle 4 to have the control valve 5 moved downwardly, so that the upper plug 56 of the control valve 5 can be removed from the short tube 38 of the cap 3, and the inner stepped plug 53 can be removed from the lower pipe 36. Consequently, the intermediate channel 39 and the inner passages 313, 361 of the upper and lower pipes 31, 36 can communicate with the inner space 23 of the bottle 2, so that the compressed air can flow into the inner space 23 of the bottle 2 via the air passage 33 of the air input connection tube 32 and the intermediate channel 39 to act upon the surface of the chemical sealant 26, so that the chemical sealant 26 can be forced by the compressed air to flow into the inner passage 361 of the lower pipe 36 via the gaps 52 of the control valve 5 (see FIG. 8), and then can flow through the concavities 710 of the projection 71 of the elongated rod 7 to enter the inner passage 313 of the upper pipe 31 (see also FIG. 5). Finally, the chemical sealant 26 can flow out of the sealant passage 35 to enter a punctured tire by way of a hose connected between the sealant output connection tube 34 and the air nozzle of the punctured tire. In particular, after the sealant dispenser has been used for a period of time, although the amount of the chemical sealant 26 contained in the bottle 2 is reduced, the recessed space 24 above the flat bottom 25 of the bottle 2 can facilitate collecting the remaining sealant in the bottom of the bottle 2, so that the remaining sealant can be effectively used by the control valve 5 without leftover.

In view of the foregoing, the sealant dispenser 1 of the present invention, which employs the cap 3 mounted to the bottle 2, wherein the cap 3 is provided with the air input connection tube 32 for receiving compressed air from an air compressor, and the sealant output connection tube 34 for delivering the chemical sealant 26 to a punctured tire. In operation, the rotary handle 4 can be rotated to move the control valve 5 downwardly for allowing the compressed air to flow into the bottle 2 to force the chemical sealant 26 to flow into the inner passages 313, 361 of the upper and lower pipes 31, 36, and finally flow out of the sealant passage 34 to enter a punctured tire, so that the punctured tire can be inflated and repaired effectively and reliably.

I claim:

1. A sealant dispenser, comprising: a bottle (2) filled with a chemical sealant; a cap mounted over a top opening of the bottle, the cap defining an air passage for receiving compressed air from an air compressor and defining a sealant passage for delivering the chemical sealant to an object; a control valve mounted in the bottle for controlling the air passage and the sealant passage, wherein the air passage and the sealant passage are closed by the control valve when the sealant dispenser is not in use; and a rotating means provided on the bottle for actuating the control valve to open the air passage and the sealant passage, so that the compressed air can flow into the bottle to deliver the chemical sealant to the object via the sealant passage, wherein the bottle has a flat bottom and defines therein an inner space which opens out at the top opening, the chemical sealant being contained in the inner space of the bottle; the cap is integrally formed with an upper pipe thereon and a lower pipe thereunder, the upper and lower pipes respectively defining inner passages communicating with each other, the upper pipe being provided with an air input connection tube defining the air passage and provided with a sealant output connection tube defining the sealant passage, the cap being threadedly mounted to a neck portion of the bottle which defines the top opening; a non-circular elongated rod being fitted in the inner passages of the upper and lower pipes; the control valve has a tube defining therein a central bore which opens out at a top opening thereof, the tube of the control valve being provided at its bottom with an inner stepped plug opposite to the top opening thereof and defining at its bottom multiple gaps around the inner stepped plug, the lower pipe being inserted into the central bore of the tube of the control valve via the top opening of the control valve such that a lower end of the lower pipe is snugly fitted over the inner stepped plug and thus closes the inner passage of the lower pipe, and a lower end of the elongated rod is in contact with the inner stepped plug of the control valve; the rotating means is a rotary handle mounted over the upper pipe of the cap to touch the elongated rod; whereby rotation of the rotary handle allows the elongated rod to move the control valve downwardly, so that the inner passage of the lower pipe can be opened to allow the chemical sealant to flow into the inner passage of the lower pipe and finally enter a punctured tire through the sealant passage and a hose connected thereto for inflating and repairing the punctured tire.

2. The sealant dispenser of claim 1, wherein the neck portion of the bottle is provided with external threads, and a recessed space is defined above the flat bottom of the bottle; the cap is provided at its inner surface with a short tube and defines at its inner surface an annular groove to be fitted with a gasket, the cap defining therein an intermediate channel, which allows the air passage to communicate with the short tube, the upper pipe being provided with a short post, wherein two adjacent sides of the cross section of the short post are formed into a right angled part, the air passage of the air input connection tube communicating with the inner space of the bottle via the intermediate channel that communicates with the short tube, the sealant passage communicating with the inner passage of the upper pipe, the inner passage of the upper pipe having a diameter less than the inner passage of the lower pipe such that an inner conical surface is formed therebetween.

3. The sealant dispenser of claim 2, wherein the elongated rod has an enlarged top end defining an annular groove to be fitted with an O-ring, and the elongated rod is provided below the enlarged top end with a projection defining multiple concavities, the projection being blocked by the inner conical surface to prevent the elongated rod sliding out of the upper pipe, the concavities of the projection allowing the chemical sealant to flow through the projection of the elongated rod.

4. The sealant dispenser of claim 2, wherein the bottom of the tube of the control valve is formed with multiple strips, and the multiple gaps are defined between the strips, the inner stepped plug being attached to lower ends of the strips, the control valve further having a stem extending upwardly from the end of the tube which defines the top opening, a distal end of the stem being formed into an upper plug which has a central pin and defines an annular cavity around the central pin, wherein the central pin can be inserted into the short tube of the cap to block the intermediate channel that communicates with the air passage of the air input connection tube, and the annular cavity can be snugly fitted around the short tube of the cap.

5. The sealant dispenser of claim 1, wherein the rotary handle has a cylindrical shell with a closed top, two opposite blades provided at the cylindrical shell, and a central post extending downwardly from an inner surface of the closed top to touch the elongated rod, the rotary handle defining a track along the cylindrical shell thereof, the track extending from an entrance opening, which is defined at a bottom of the cylindrical shell of the rotary handle, to a terminal end at a higher position, the cylindrical shell of the rotary handle being provided with an engagement pin close to the terminal end of the track.

* * * * *